UNITED STATES PATENT OFFICE.

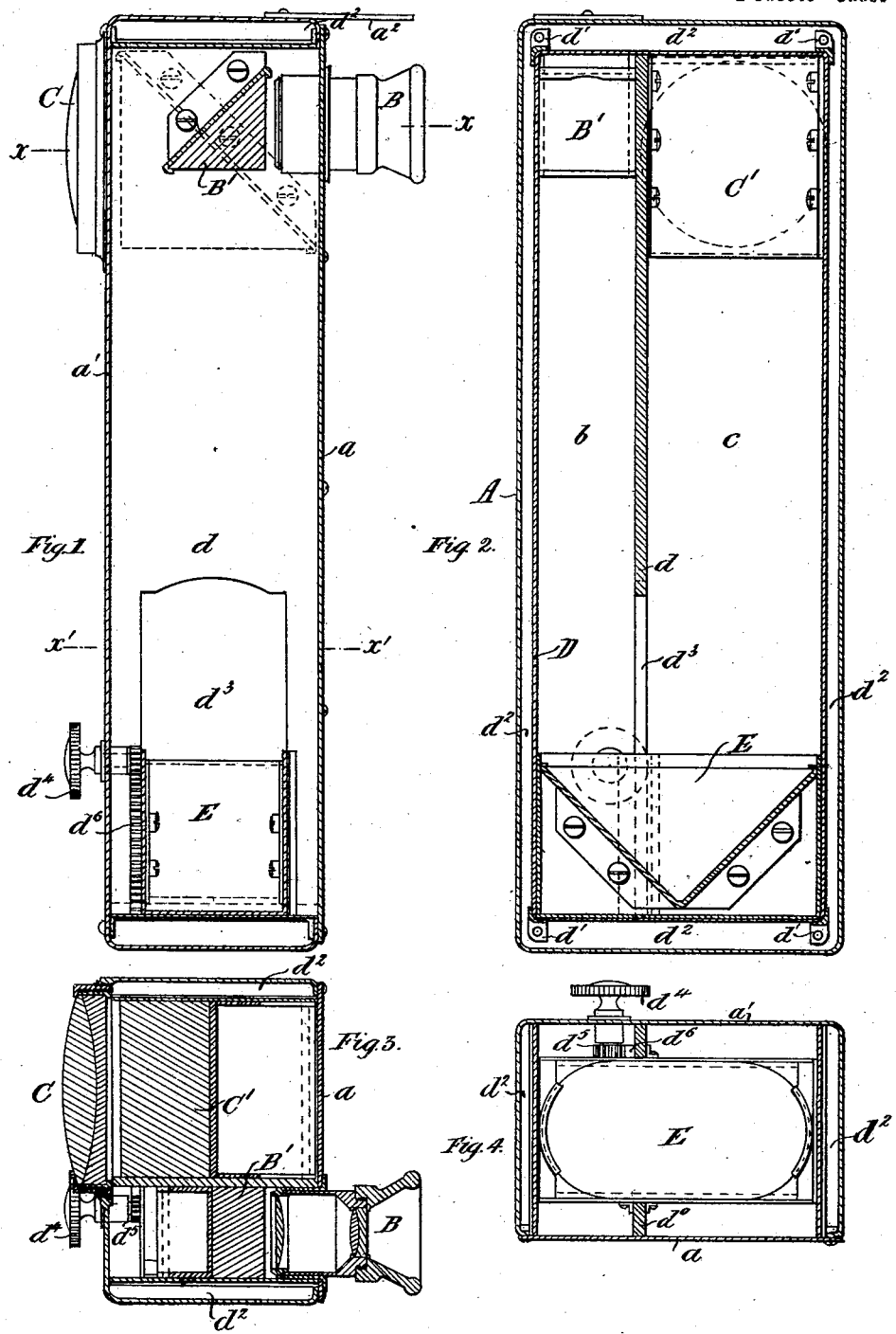

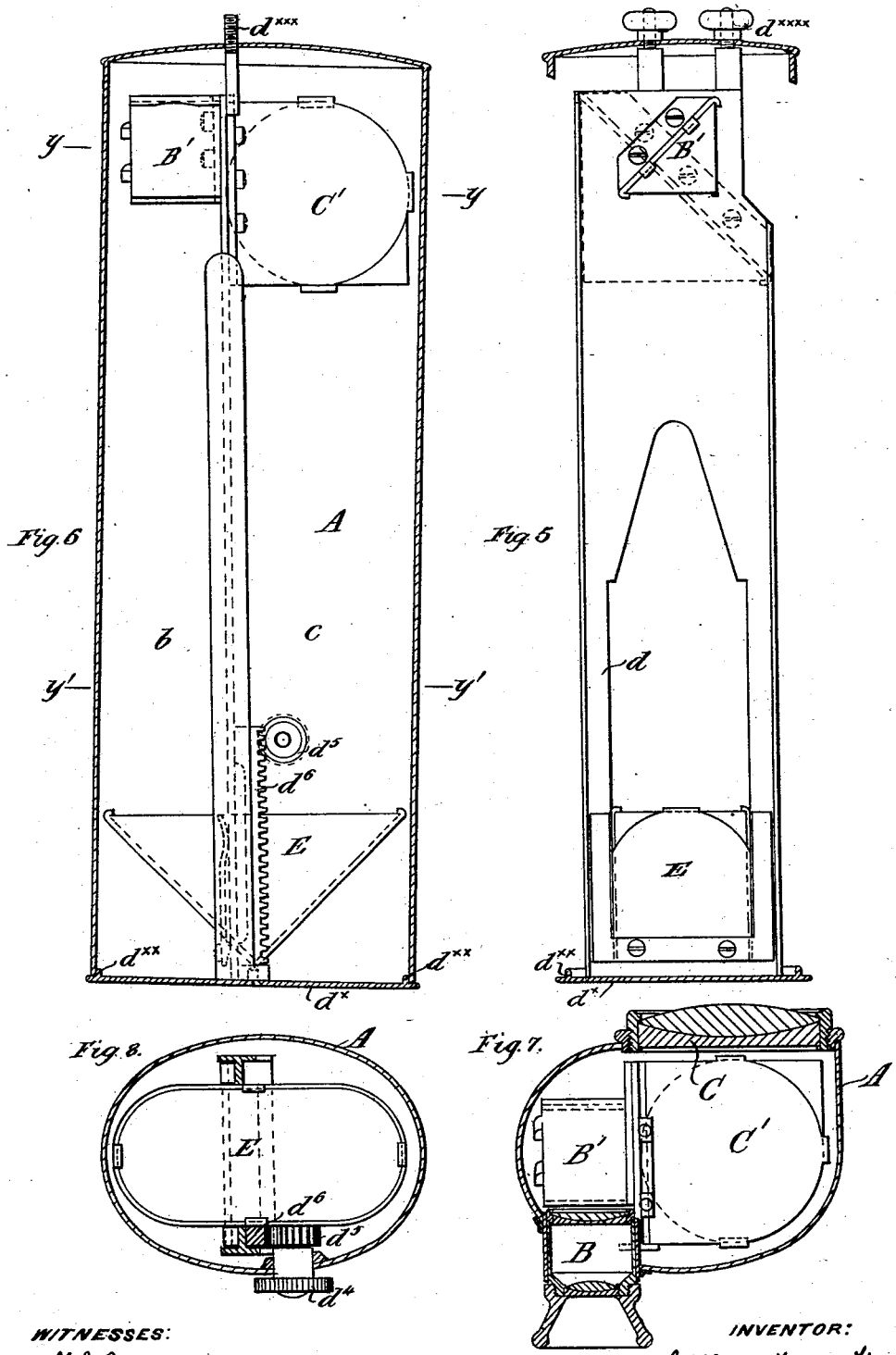

WILLIAM HENRY HARVEY, OF WESTMINSTER, ENGLAND.

PRISM-TELESCOPE.

SPECIFICATION forming part of Letters Patent No. 715,793, dated December 16, 1902.

Application filed August 31, 1901. Serial No. 73,931. (No model.)

*To all whom it may concern:*

Be it known that I, WILLIAM HENRY HARVEY, a subject of the King of Great Britain and Ireland, residing at 17 Old Queen street, in the city of Westminster, England, have invented new and useful Improvements in Prism-Telescopes, (in respect whereof I have applied for a patent in Great Britain to bear date February 13, 1901, No. 3,136,) of which the following is a specification.

This invention relates to an improved construction of prism-telescope, whereby access is readily obtained to the prisms and lenses for cleaning purposes without incurring the risk of throwing them out of optical alinement (a most important desideratum in instruments of the class referred to) and whereby the instrument, which would otherwise require the supervision of an expert, is rendered capable of being manipulated and maintained in serviceable condition by any ordinary person exercising reasonable care. To attain this object, I mount the prisms upon a rigid carrier comprising a skeleton frame or lining distinct from the outer or inclosing casing of the instrument in such a manner that the carrier, with its prisms, may be withdrawn as an integral body from the casing and the surfaces of the prisms traversed by the light-rays exposed and rendered accessible for cleaning purposes, the replacement of the said prism-carrier in the casing being secured with absolute precision of position by providing suitable guides in the casing wherein the frame or carrier slides and rests. The outer casing is made with certain removable segments, so as to permit of access to its interior and of the withdrawal of the frame therefrom, the structure being of such a character as to be as nearly air and dust tight as possible.

Having described in general terms the nature of my invention, I will now proceed to describe its construction with reference to an arrangement of monocular prism telescope proposed by Porro some forty years ago and wherein the rays of light in their passage from the object-glass to the eyepiece (convex) are deflected by a right-angled prism placed behind the object-glass and sent off at right angles down a chamber formed in a hollow vertical shaft by which the instrument is held until they meet another right-angled prism placed transversely to the first prism and with its hypotenuse upward. In this prism the rays strike one of the sides containing the right angle, are deflected to the right or left, as may be arranged, and then striking the other side containing the right angle are sent up through another chamber formed in the hollow vertical shaft or handle until at the top thereof they meet a third right-angled prism and are reflected at right angles out through the eyepiece, the effect of the whole arrangement being to erect the image and to absorb in the passage of the rays down and up the shaft or handle a great deal of the space required between the object-glass and the eyepiece.

In the accompanying drawings, Figure 1 is a vertical section taken through the eyepiece-chamber, and Fig. 2 a vertical section taken at right angles to Fig. 1 and through both the eyepiece and object-glass chambers and illustrating a construction wherein the frame or lining constituting the prism and lens-carrier is capable of withdrawal sidewise from the inclosing casing, Fig. 3 being a transverse section along the line $x\ x$ in Fig. 1, and Fig. 4 a similar section along the line $x'\ x'$ in Fig. 1. Figs. 5 and 6 are views, respectively, similar to Figs. 1 and 2, illustrating an alternative construction wherein the prism and lens frame or carrier is capable of withdrawal endwise from the inclosing casing, Figs. 7 and 8 being transverse sections along the lines $y\ y$ and $y'\ y'$, respectively, in Fig. 6.

A is a rectangular box or casing, on the lid or cover $a$ whereof the eyepiece B is mounted, the object-glass C being mounted on the side $a'$ of the box remote from the cover $a$. It will be readily seen that with a lid or cover, such as $a$, hinged or recessed or attached by means of screws $a^2$, as shown, so as to fit exactly into a definite and sole position with respect to the other sides of the box or casing, the positions of the eyepiece B and object-glass C are fixed and unalterable not only relatively to one another when the box is closed, but also with respect to the battery of prisms— viz., the object-glass prism C′, the double-reflecting prism E, and the eyepiece-prism B′— which, according to the method of construction illustrated in Figs. 1 to 4, are mounted in a rectangular frame or lining D, adapted to pass into but not to occupy the whole of the space inside the box A. The lining is provided with a longitudinal partition $d$, whereby it is divided into two chambers $b$ and $c$, which may be termed, respectively, the "eyepiece-chamber" $b$ and the "object-glass" chamber $c$, seeing that they open, respectively to these two glasses near their upper end. The lining or carrier D, which is slightly smaller than the casing or box A, is arranged to slide in and be supported by guiding studs or strips $d'$ $d'$, its stability in the casing being hereby insured, while, at the same time, an air-space $d^2$ is provided which tends to prevent exterior heat from affecting the action of the prisms, and to protect the prisms against injury by concussion. With optically-worked prisms this feature of the construction is of essential importance, such prisms being very sensitive to disturbance under the influence of unequal heating. The double-reflecting prism E is mounted on a slide $d^0$, capable of up-and-down movement, and is arranged transversely to the chambers $b$ and $c$, the partition $d$ being cut away at $d^3$ with a view to permitting movement of the prism for focal adjustment. The function of the prism is, as already stated, to receive the rays traversing the object-glass chamber $c$ and to return them in the opposite direction through the eyepiece-chamber $b$. The slide $d^0$ is operated by means of the nut $d^4$ and pinion $d^5$, the latter meshing with the rack $d^6$, carried by the slide, or the focal adjustment can be obtained by a movable eyepiece or object-glass, or the ordinary opera-glass arrangement may be employed, provision being made in any case for enabling the frame to be removed and replaced without interfering with the action of the gearing.

According to the alternative construction illustrated in Figs. 5 to 8 all the prisms are mounted upon the removable carrier comprising the partition $d$, which is strengthened for the purpose and carries a bottom plate $d^\times$. The casing A is arranged to inclose the carrier-partition, as also the prisms, and to fit tightly against a beading $d^{\times\times}$, formed on the bottom plate $d^\times$. By means of screws $d^{\times\times\times}$ and nuts $d^{\times\times\times\times}$ the carrier-partition is attached to the casing A, the former being arranged at an inclination to the walls of the casing in such a manner as to be approximately parallel with the extreme rays of the respective chambers $b$ and $c$ of the instrument. By removing the nuts $d^{\times\times\times\times}$ the partition, together with the prisms carried thereby, may be withdrawn through the bottom of the casing A, thus rendering the operation of examining and cleaning the interior easy of accomplishment.

The form of eyepiece I employ is that known as an "astronomical" eyepiece, whereby the magnification of the image is effected, the inversion of the image being effected by the prisms. By arranging the chambers in the manner shown, wherein the eyepiece is situated near one of the upper corners of the casing A, no inconvenience is experienced when applying the eye to the eyepiece by the nose coming into contact therewith.

An arm $a^2$ may be pivotally mounted on the casing for use in steadying the instrument against the forehead while in use.

What I claim as my invention, and desire to secure by Letters Patent, is—

1. A prism-telescope comprising a frame or carrier, prisms mounted integrally in the said frame, the entrant and emergent surfaces of the prisms being accessible for cleaning purposes without interfering with their fixed positions in the carrier, a casing inclosing the said frame, and lenses mounted integrally in the said casing; all arranged substantially as herein described and whereby the frame with its prisms is capable of removal from and replacement in the casing without risk of disturbing the optical alinement of the prisms and lenses.

2. In a prism-telescope, the combination of a casing whereon are mounted the eyepiece and the object-glass, a prism carrier or frame distinct from the said casing mounted therein and capable of withdrawal with its prisms as an integral body therefrom, a slide arranged in the said carrier or frame whereon the double-reflecting prism is mounted, a rack on the said slide, a toothed pinion meshing with the rack, and a nut on the exterior of the instrument for operating the said pinion, substantially as specified.

In testimony whereof I have signed my name to this specification in the presence of two subscribing witnesses.

WILLIAM HENRY HARVEY.

Witnesses:
 JAMES P. MAGINNIS,
 J. F. FAWCETT.